E. L. LANFAIR.
AUTOMOBILE DOOR.
APPLICATION FILED SEPT. 3, 1920.
1,416,651.
Patented May 16, 1922.
2 SHEETS—SHEET 1.
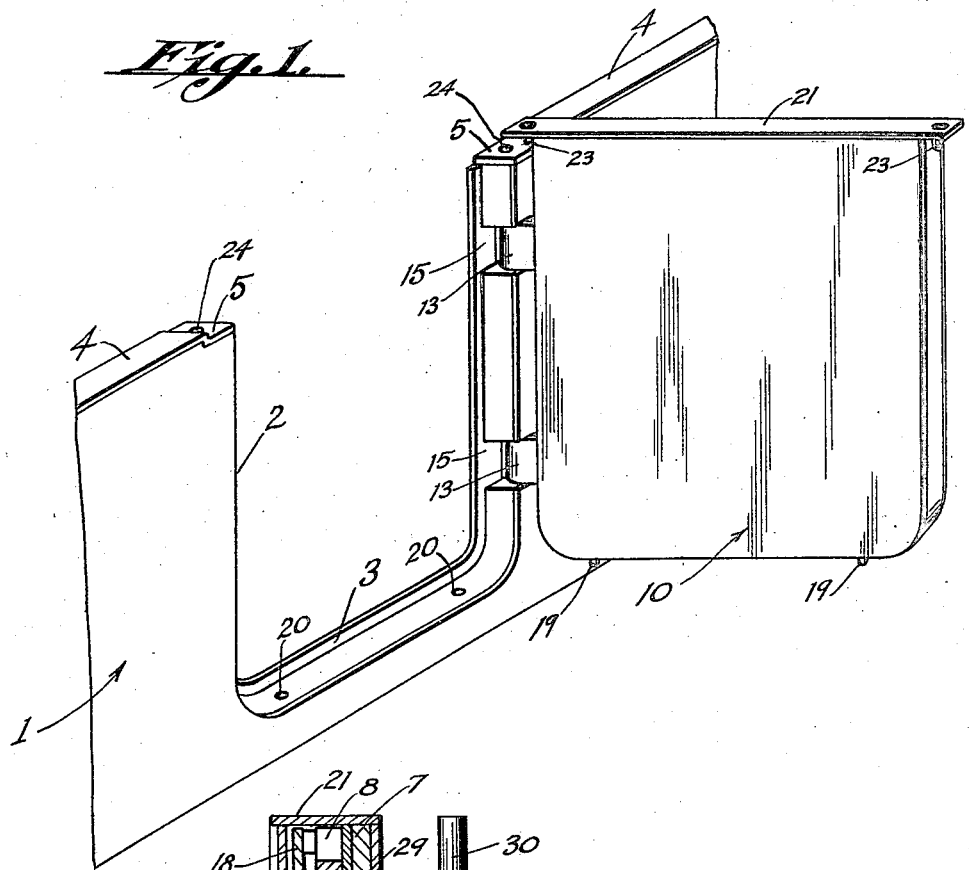
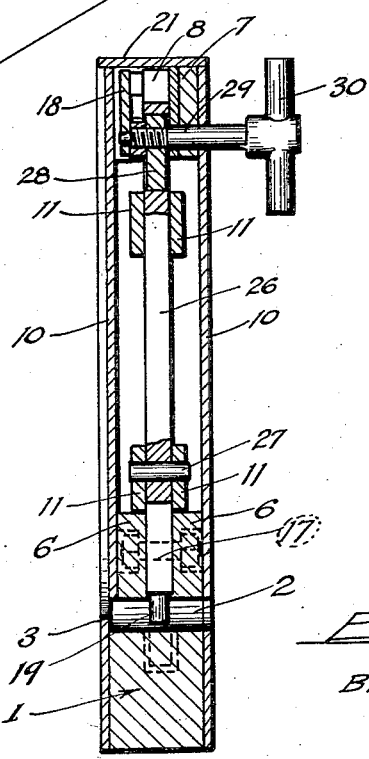
Inventor:
ERNEST L. LANFAIR.
BY Hazard & Miller
Attorneys.

E. L. LANFAIR.
AUTOMOBILE DOOR.
APPLICATION FILED SEPT. 3, 1920.

1,416,651.

Patented May 16, 1922.

Inventor:
Ernest L. Lanfair.
By Hazard & Miller
Attorneys

UNITED STATES PATENT OFFICE.

ERNEST L. LANFAIR, OF LANFAIR, CALIFORNIA.

AUTOMOBILE DOOR.

1,416,651.

Specification of Letters Patent. Patented May 16, 1922.

Application filed September 3, 1920. Serial No. 407,938.

*To all whom it may concern:*

Be it known that I, ERNEST L. LANFAIR, a citizen of the United States, residing at Lanfair, in the county of San Bernardino and State of California, have invented new and useful Improvements in Automobile Doors, of which the following is a specification.

It is the object of this invention to provide a door for automobiles and the like which will be positively held against accidental opening.

More specifically it is the object of the invention to provide a hinged door which is vertically shiftable by turning the handle of the door, said door being provided with vertically disposed locking pins adapted to engage the door frame to secure the door in closed position and arranged to be disengaged from the door frame in order to permit free swinging of the door when the latter is shifted vertically.

The invention will be readily understood from the following description of the accompanying drawings, in which—

Figure 1 is a perspective view of the side of an automobile body showing a door in open position.

Fig. 4 is a transverse section on the line 4—4 of Fig. 2.

Figure 2:
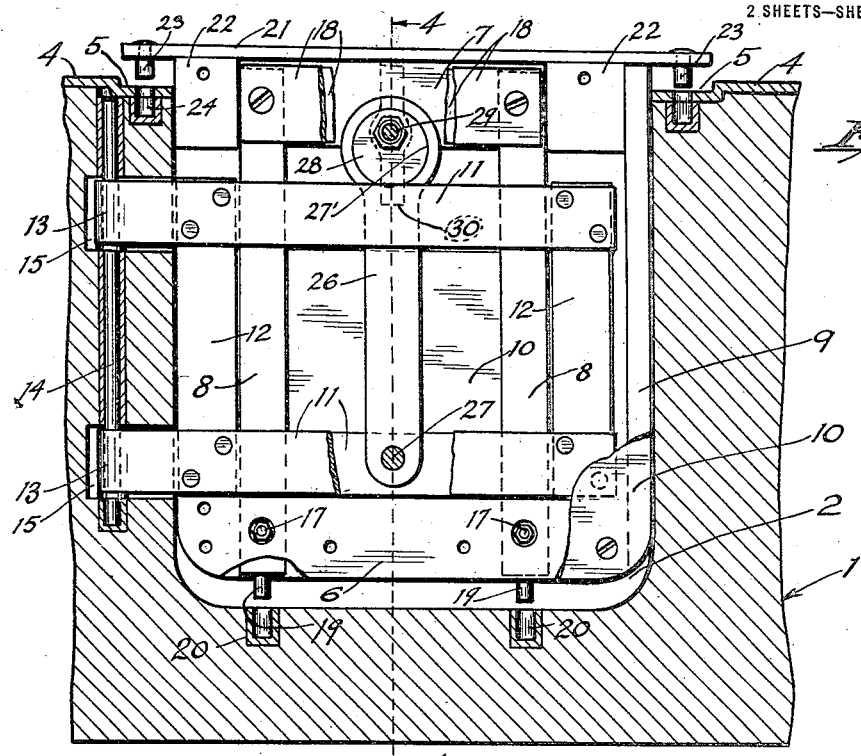
Fig. 2 is a side elevation of the door shifted to permit swinging movement of the same, the surface of the door and the automobile body being broken away to show the opening parts.

In the drawings I have shown a portion of the side wall of an automobile body at 1, said wall being provided with the door opening 2. The inner surface of wall 1 is preferably flushed with the opening 2 while the outer surface of the wall projects over the edge of opening 2 to form a lip 3 around said opening. Strips 4 are preferably provided upon the upper edge of wall 1 and are offset adjacent opening 2 in order to form recesses 5.

The door arranged to close the opening 2 is formed upon a frame which includes spaced base bars 6 and top bar 7. At the swinging edge of the door the bars 6 and 7 are connected by an upright bar 9 and a casing 10 is secured over the inner and outer surfaces of the door in order to form a hollow interior adapted to carry the actuating mechanism.

Cross bars 11 are arranged in spaced relation across the door and are connected by uprights 12 received between the spaced cross bars. At the pivoted edge of the door the cross bars 11 at one side of upright 12 project beyond the door and terminate in loops 13 journaled upon a pivot rod 14 arranged in upright position in the door frame. The door frame is suitably recessed as shown at 15 in order to receive the looped ends of cross bars 11. The door is thus arranged for swinging movement relative to the door frame and when in closed position will abut against the lip 3 to form a tight closure.

The connection between the door and the cross bars 11 includes uprights 8 slidably received between the spaced cross bars 11 and secured at their lower ends between the base bars 6 of the door frame as by bolts 17. The upper ends of uprights 8 are received between cross bars 18 fixed to said upright and received against the top cross bar 7. Locking pins 19 depend from uprights 8 so as to project below the lower edge of the door and said locking pins are arranged to be received in co-operating recesses 20 formed in the door frame. A strip 21 preferably extends across the top of the door frame and may be supported by blocks 22 fixed to top cross bar 7 at the ends of cross bars 18. The strip 21 extends beyond the edges of the door so as to be received in recesses 5 and is provided with depending locking pins 23 arranged to be received in co-operating recesses 24 formed in the bases of recesses 5.

By the construction as thus set forth it will be seen that cross bars 11 are pivotally fixed relative to the door frame and that the door itself is vertically shiftable relative to cross bars 11 through the sliding movement of uprights 8 between cross bars 11. When the door is swung closed and is lowered with relation to cross bars 11 pins 19 are received in recesses 20 and pins 23 are received in recesses 24. The door is then positively locked in closed position. When it is desired to open the door it is raised with relation to cross bars 11 so that the locking pins are disengaged from their respective recesses and the door may be then readily swung to open position upon the hinged connection provided by pivot rod 14 and the loops of cross bars 11.

The mechanism for shifting the door into either locked or interlocked position includes a link 26 pivoted at its lower end between the lower cross bars 11 as shown at 27 and extending upwardly between the upper cross bars 11. A bearing 27' is formed in the upper end of link 26 and an eccentric 28 is received in said bearing and is preferably positioned between cross bars 18. The eccentric is fixed upon an actuating rod 29 journaled in cross bars 18 and extending through the door to the exterior thereof. An operating handle 30 is fixed upon the rod 29 so that by turning the same the eccentric 28 may be rotated for raising or lowering the door relative to link 26 as will be readily understood by reference to Figs. 2 and 3.

Figure 3:
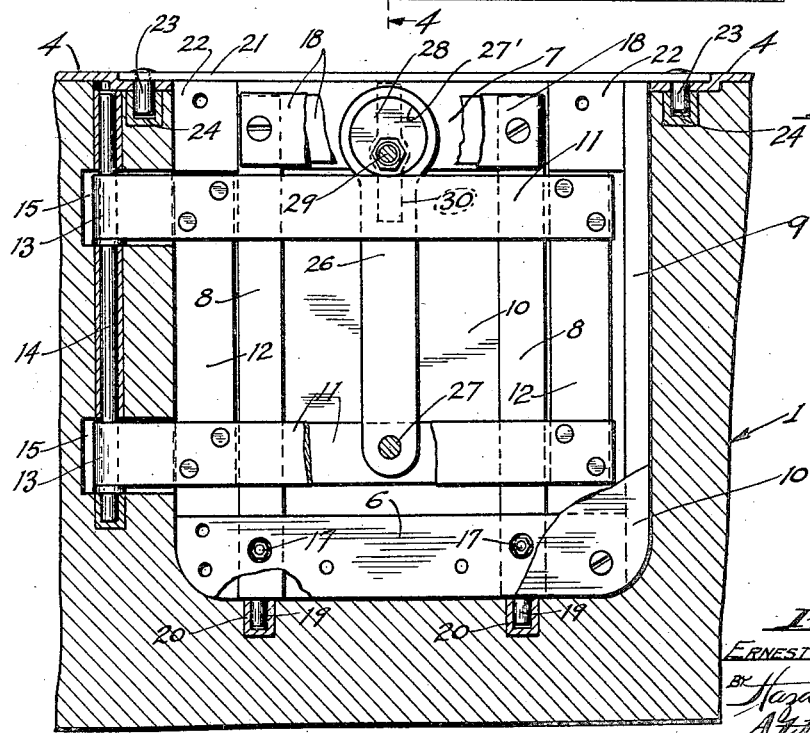
Fig. 3 is a similar view showing the door shifted into locked position.

When the door is closed and the handle 30 is turned so as to bring eccentric 28 to the position shown in Fig. 3 it will be seen that the door is positively locked and held against unlocking until eccentric 28 is again rotated to the position shown in Fig. 2. It will furthermore be understood that such rotation of the eccentric is impossible unless handle 30 be rotated and it will thus be seen that the improved door construction provides locking means whereby accidental opening of the door is impossible.

Various changes may be made without departing from the spirit of the invention as claimed.

What is claimed is:

1. The combination with a door frame of a door, a hinge connection between said door and frame, said door being vertically shiftable relative to said hinge connection, means for shifting said door, which means comprises a link carried by said hinge connection, an eccentric received in a bearing of said link and pivoted to said door so that rotation of said eccentric will cause said shifting of the door, said shifting means contained within the sides of said door and an actuating handle to which said eccentric is fixed projecting beyond the side of said door for rotating said eccentric.

2. The combination, with a door frame, of a frame hinged to the side of the said door frame, a door structure carried by said hinged frame and movable vertically thereupon, a link pivotally connected at its lower end to the hinged frame, the upper end of said link being provided with an opening, an eccentric positioned within the opening in said link, and a handle carried by the vertically movable door structure and passing through said eccentric.

3. The combination, with a door frame, of a frame hinged to the side of the said door frame, a door structure carried by said hinged frame and movable vertically thereupon, a link pivotally connected at its lower end to the hinged frame, the upper end of said link being provided with an opening, an eccentric positioned within the opening in said link, a handle carried by the vertically movable door structure and passing through said eccentric, and means carried by the door structure and adapted to engage in recesses in the door frame to secure the door structure when the latter is closed.

4. The combination, with a vehicle body having a door opening, of a skeleton frame hinged to the vehicle body to the side of said door opening, a door structure carried by said hinged frame and movable vertically thereupon, which door structure encloses the greater portion of said hinged frame, projections on said door structure that are adapted to enter recesses in the vehicle body adjacent to the door opening therein when the door is closed, and means within the door structure and arranged between the same and the hinged frame for elevating said door structure to permit the same to be swung out of the door opening.

In testimony whereof I have signed my name to this specification.

E. L. LANFAIR.